United States Patent
Craig et al.

(10) Patent No.: US 6,513,112 B1
(45) Date of Patent: Jan. 28, 2003

(54) SYSTEM AND APPARATUS FOR ADMINISTRATION OF CONFIGURATION INFORMATION USING A CATALOG SERVER OBJECT TO DESCRIBE AND MANAGE REQUESTED CONFIGURATION INFORMATION TO BE STORED IN A TABLE OBJECT

(75) Inventors: Robert M. Craig, Bellevue, WA (US); Radu Rares Palanca, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/360,441

(22) Filed: Jul. 26, 1999

(51) Int. Cl.[7] .................. G06F 15/177; G06F 9/00; G06F 15/163

(52) U.S. Cl. .............. 713/1; 713/2; 713/100; 709/310; 709/316

(58) Field of Search ............... 713/100, 1, 2; 709/310, 316

(56) References Cited

U.S. PATENT DOCUMENTS

| | | | |
|---|---|---|---|
| 5,287,507 A | * 2/1994 | Hamilton et al. | 709/315 |
| 5,485,617 A | 1/1996 | Stutz et al. | |
| 5,517,645 A | 5/1996 | Stutz et al. | |
| 5,689,703 A | 11/1997 | Atkinson et al. | 395/614 |
| 5,706,505 A | 1/1998 | Fraley et al. | |
| 5,794,038 A | 8/1998 | Stutz et al. | |
| 5,822,580 A | 10/1998 | Leung | 395/614 |
| 5,842,018 A | 11/1998 | Atkinson et al. | 395/700 |
| 5,848,234 A | * 12/1998 | Chernick et al. | 709/203 |
| 5,867,650 A | * 2/1999 | Osterman | 709/203 |
| 5,911,068 A | 6/1999 | Zimmerman et al. | |
| 6,047,289 A | * 4/2000 | Thorne et al. | 707/10 |
| 6,144,959 A | * 11/2000 | Anderson et al. | 707/9 |
| 6,304,967 B1 | * 10/2001 | Braddy | 713/150 |

OTHER PUBLICATIONS

Dale Rogerson, *Inside COM*, 1997; Chapter 1,; pp. 116–126.
Distributed Computing Monitor vol. 13, No. x; *COM+ The Future of Microsoft's Component Object Model*, Featured Report by David Chappell; pp. 3–17.

* cited by examiner

Primary Examiner—Thomas Lee
Assistant Examiner—James K. Trujillo
(74) Attorney, Agent, or Firm—Merchant & Gould P.C.

(57) ABSTRACT

A requested table of configuration information is accessed through a catalog server object that manages the configuration information in one or more datastores. A client table object is created on a client computer, and a catalog server object is queried from the client table object for table information associated with the requested table. The client table object receives the table information from the catalog server object and records the table information on the client computer. A connection is established between the client table object and the catalog server object, and the catalog server object is requested to populate a read cache of the client table object. A table system is created through the catalog server object to access the requested configuration information, and a read cache in the table system is populated with the requested table of the configuration information.

21 Claims, 8 Drawing Sheets

SYSTEM AND APPARATUS FOR ADMINISTRATION OF CONFIGURATION INFORMATION USING A CATALOG SERVER OBJECT TO DESCRIBE AND MANAGE REQUESTED CONFIGURATION INFORMATION TO BE STORED IN A TABLE OBJECT

TECHNICAL FIELD

The invention relates generally to object-oriented data processing and system management, and more particularly to the administration of configuration information in a catalog system.

BACKGROUND OF THE INVENTION

An executable software program or application can require access to system-wide, configuration-type information when the application is being installed or modified on a computer system (i.e., at configuration-time) and at the time the application is executed to perform its intended function (i.e., at runtime). Typically, the application accesses configuration information related to available services and resources on the local computer system, including available software components, hardware, and available services offered by the system that improve the functionality of the application within the overall system.

Accessing the configuration information is done through a catalog management system having both a catalog of the configuration information and an ability to provide available services to a requesting application. The application code requests the configuration information from the catalog management system, which responds by presenting the configuration information to the application in the requested format. Meanwhile, the management system also provides services through embedded logic in response to the configuration information requests. The services may relate to such items as security, validation, roles, etc. as well as network communication conflict management.

The services are typically exploited through an attribute-based programming scheme, which allows application developers to specify services and resources called for in an application by setting properties (or "attributes") of each application or component, rather than implementing or calling those services directly from the implementation code. Attributes include a particular set of configuration information that is made available to various callers in an attribute-based environment.

Even in an attribute-based programming environment, the application desiring data and services must know where the configuration information is located within the system. Moreover, the calling program typically must understand the format in which the information is stored to be able to access the information. In existing approaches, a system "registry" has been used to store configuration data for a particular machine. However, in existing approaches, a programmer was required to access and manipulate registry information directly, introducing undesirable program complexity and exposing the registry to the risk of corruption by improper programming. Moreover, the distribution of configuration information among multiple computing systems is not accommodated by existing approaches. In current approaches, the administration code itself must be altered in order to handle location and format changes to configuration information in different computing systems.

Further, the administration (e.g., writing, reading and updating) of configuration information in some systems has relied on an administration API (application program interface) that provided methods for accessing the registry directly. Accordingly, an administration tool is bound by the API to the registry of a single computing system. A problem is also presented if the configuration information is moved to a different datastore or recorded in a format that is different than that of the registry.

It is with respect to these and other considerations that the present invention has been made.

SUMMARY OF THE INVENTION

In accordance with this invention, the above and other problems were solved by accessing a requested table of configuration information through a catalog server object that manages the configuration information in one or more datastores of a computer system. An administration tool causes the client table object to be created in order to read or write configuration information available to the client table object.

Once the client table object obtains the configuration information from catalog server objects and records the information in its cache, subsequent access by the administration tool to the configuration information is serviced by the client table object until the cache is refreshed or changes to the configuration information are written back to the corresponding datastores. While the client table object is servicing these accesses internally, any connections to the catalog server objects may be released.

A system for accessing a requested table of configuration information stored in one or more datastores is provided. A table object includes a cache that stores the configuration information and a table interface through which a caller can access the requested table of configuration information in the cache. A catalog server object manages the configuration information stored a datastore and communicates the configuration information with the table object. A table system is created by the catalog server object to provide the catalog server object with access to the requested table of configuration information stored in the datastore.

A program product for accessing a requested table of configuration information through a catalog server object that manages the configuration information in one or more datastores is also provided. A table object having a cache that stores the configuration information is created. The catalog server object is queried for table information describing the requested table. The table object receives the table information from the catalog server object and records the table information in the table object. The configuration information is accessed by a caller through the cache of the table object, in accordance with the table information.

These and various other features as well as advantages which characterize the present invention will be apparent from a reading of the following detailed description and a review of the associated drawings.

DETAILED DESCRIPTION OF THE INVENTION

In an embodiment of the present invention, a client table object communicates with one or more catalog server objects to access configuration information stored in datastores on one or more computer systems. The catalog server objects may be local (i.e., on the same computer as the client table object) or remote (i.e., on a different computer).

An administration tool causes the client table object to be created in order to read or write configuration information available to the client table object. Once the client table object obtains the configuration information from one or more catalog server objects and records the information in its cache, subsequent access by the administration tool to the configuration information is serviced by the client table object until the cache is refreshed or changes to the configuration information are written back to the corresponding datastores. While the client table object is servicing these accesses internally, any connections to the catalog server objects may be released.

Figure 1:
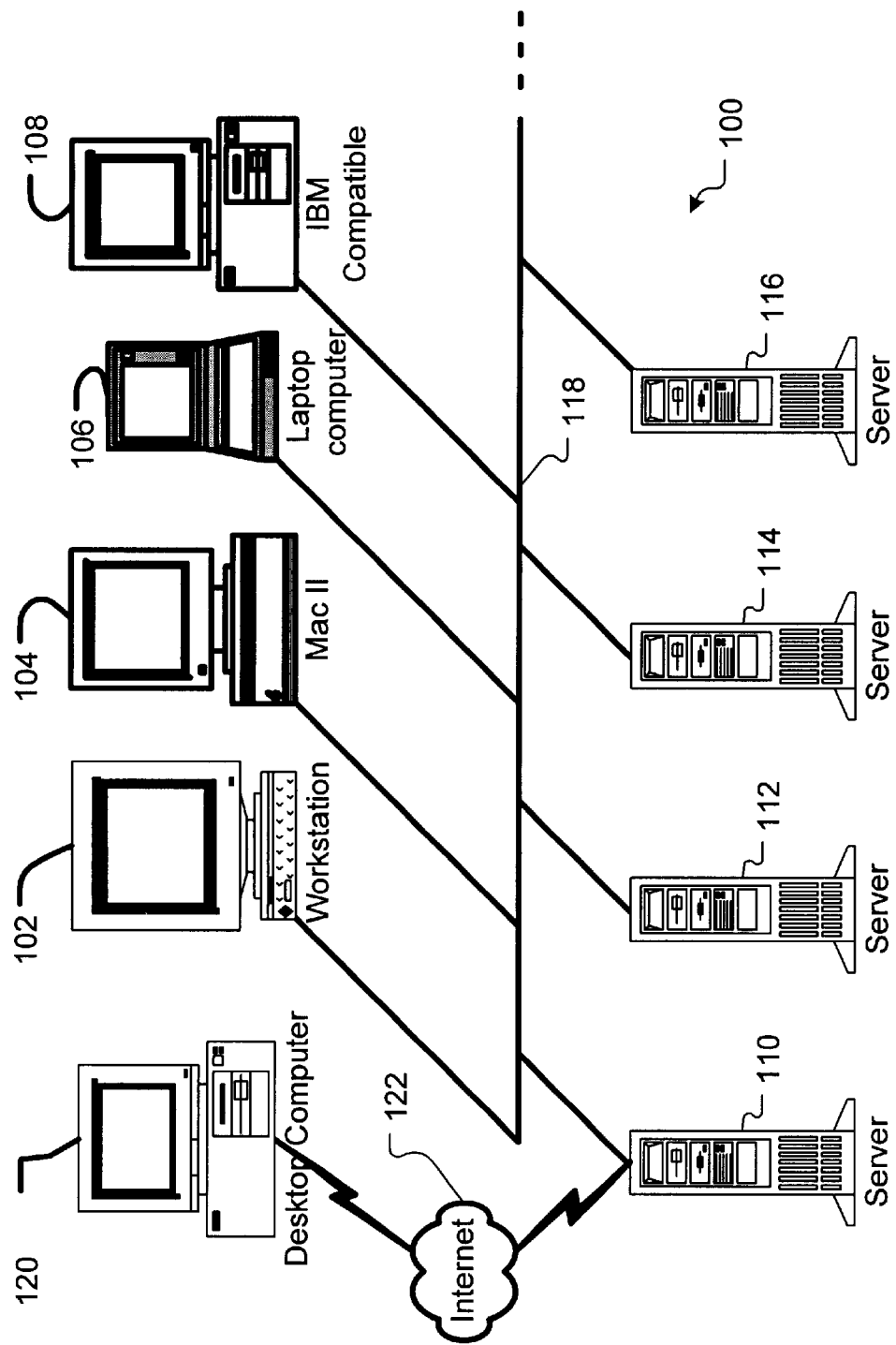
FIG 1. illustrates a pictorial representation of a suitable client/server computing environment in which an embodiment of the present invention may be implemented in both clients and servers.

FIG. 1 is a pictorial representation of a suitable client-server computing environment in which an embodiment of the present invention may be implemented in both clients and servers. In a computing network 100, client computer systems 102, 104, 106 and 108 are connected to server computer systems 110, 112, 114 and 116 by a network connection 118. Additionally, client computer 120 is connected to server computer 110 via a communication link, such as the Internet 122 or a local area network. Since the server 110 is connected via the network connection 118 to the other servers 112, 114 and 116, the client computer 120 is also connected and may access information on the other servers 112, 114 and 116, and clients 102, 104, 106, and 108, as well as other computer systems coupled to the network 100.

The client computer systems 102, 104, 106, 108 and 120 operate using at least some of the information and processes available on at least one of the servers 110, 112, 114 and 116 as well as other computer systems coupled to the network 100. Each client is preferably a complete, stand-alone computer and offers the user a full range of power and features for running applications. The clients 102, 104, 106 and 108, however, may be quite different from the other clients as long as they can communicate via the common interface 118.

The servers 110, 112, 114 and 1 16 are preferably computers, minicomputers, or mainframes that provide traditional strengths offered by minicomputers and mainframes in a time-sharing environment (e.g., data management, information sharing between clients, and sophisticated network administration and security features). The client and server machines work together to accomplish the processing of the executed application. Working together in this manner increases the processing power and efficiency relating to each independent computer system shown in FIG. 1.

Typically, a client portion or process of an application executed in the distributed network 100 is optimized for user interaction whereas a server portion or process provides the centralized, multi-user functionality. However, each client computer 102, 104, 106, 108 and 120 can perform functions for other computers, including the clients and servers, thus acting as a "server" for those other computer systems. Similarly, each of the servers 110, 112, 114 and 116 can perform functions and relay information to the other servers, such that each server may act as a "client" requesting information or services from another computer in particular circumstances. Therefore, the term "client," as used hereinafter refers to any computer system making a call or request of another computer system and the term "server" is the computer system servicing the request.

As part of the sophisticated network administration, each computer is able to access configuration information related to applications and resources available on the other computers in the network 100. The configuration information is located within memory or persistent storage on each computer system, i.e., in a datastore. Additionally, each computer system may have more than one datastore of configuration information that must be accessed by the other computer systems. Moreover, the different datastores may each have different data types or formats. In order to access configuration information from these many and various computer datastores, a client, i.e., the system or process making the request for information, communicates with a "catalog" interface on the computer system.

Figure 2:
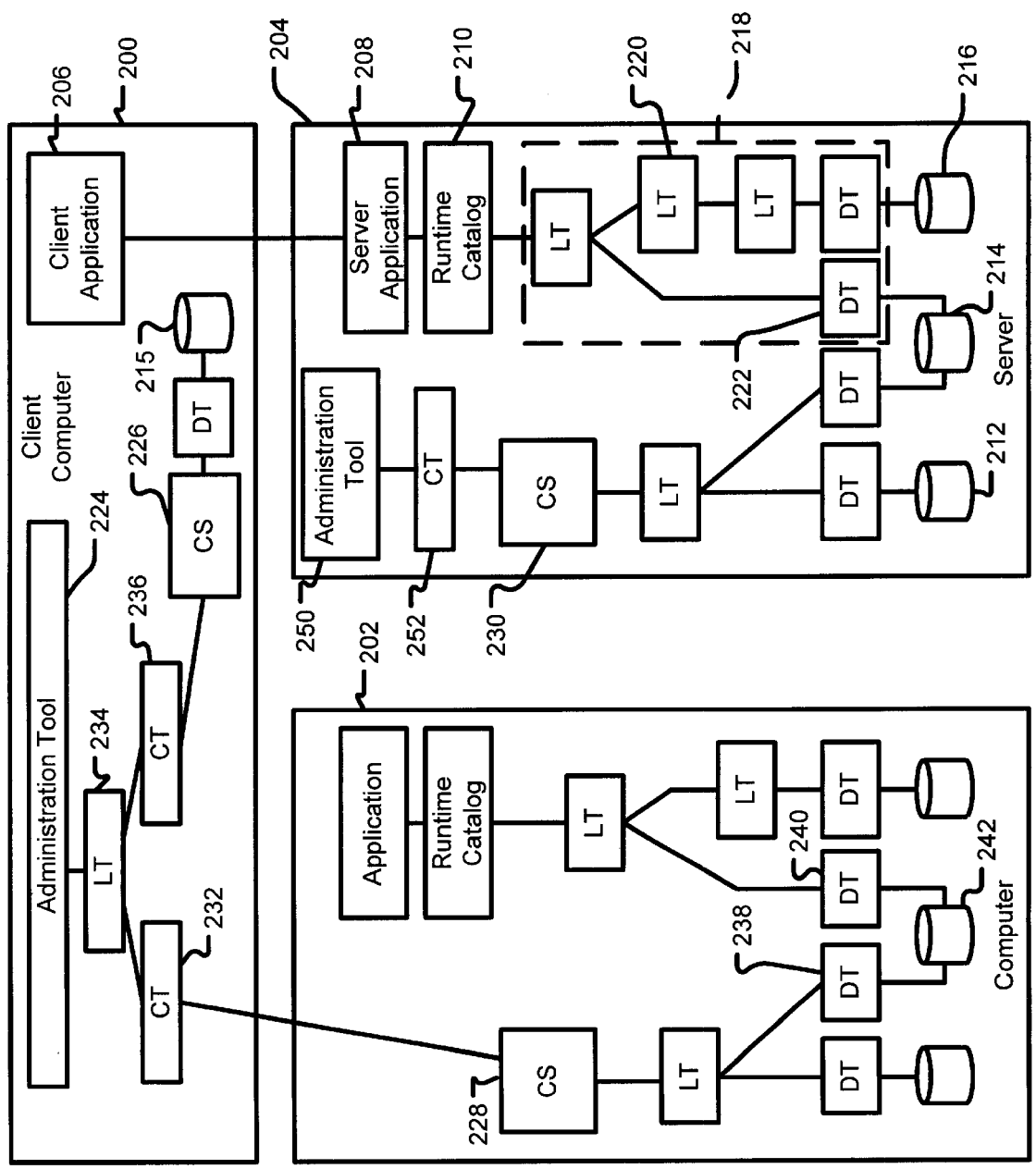
FIG. 2 illustrates a client table/catalog server architecture of an embodiment of the present invention.

FIG. 2 depicts an exemplary client/server architecture employing COM+ catalogs in accordance with the present invention (COM is an acronym for Component Object Model). A COM+Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects". COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects' clients.

COM+technology is an extension of COM technology that includes a new runtime library providing a wide range of new services, such as dynamic load balancing, queued components, an in-memory database, and loosely coupled events. COM+technology maintains the basics of COM technology, and existing COM-based applications can continue to work unchanged in a COM+environment.

An object implemented to comply with COM+is referred to as a "COM+object". A component that includes one or more classes that may be instantiated as a COM+object is referred to as a "COM+component". Each COM+ component has attributes, which can be set in a component (or type) library. Attributes are a form of configuration information required by many software components to execute correctly and completely. An application that includes COM+components is referred to as a "COM+ application". When a component is made part of a COM+ application, its component (or type) library is written into a COM+catalog. When an object is instantiated from that component, the attributes in the COM+catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration information recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 can access configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally as table system 218) providing the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration information in the datastores 214 and 216 through layers of abstraction provided by the table system 218 (i.e., including logic table objects (LT), such as logic table object 220, and data table objects (DTs), such as data table object 222).

A globally unique database ID (identifier) called a "DID" identifies each catalog database. A given DID guarantees a minimum well-defined set of catalog tables, each table being identified by and complying to the rules of a table ID (TID). A DID is a datastore-independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the read cache of data table object 222 may be refreshed from the datastore 214 and data in a write cache may be flushed to the datastore 214. Data table objects are described in more detail in U.S. patent application Ser. No. 09/360,442, entitled "DATA TABLE OBJECT INTERFACE FOR DATASTORE," assigned to the assignee of the present application, filed concurrently herewith and incorporated herein by reference for all that it discloses and teaches.

A logic table object, such as logic table object 220, presents domain-specific table data by logically merging or consolidating table data from multiple data table and/or logic table objects, supplementing table functionality, and/or synthesizing data into the table. Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configurations of table systems are possible.

More specifically, a logic table object can logically merge or consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table. Logic table objects are described in more detail in U.S. patent application Ser. No. 09/360,440, entitled "A LOGIC TABLE ABSTRACTION LAYER FOR ACCESSING CONFIGURATION INFORMATION," assigned to the assignee of the present application, filed concurrently herewith and incorporated herein by reference for all that it discloses and teaches.

The foregoing discussion has described the COM+ Catalog environment as used at runtime by an application. An alternate use of a COM+ Catalog occurs at configuration-time and may employ one or more catalog server objects (CS) and one or more client tables. During configuration, an administration tool, such as Microsoft's Component Services administration tool or COMAdmin Library, is used to create and configure COM+applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2 to administer configuration on a local or remote computer. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object (CT) is analogous to a data table object that binds to a particular local or remote catalog server object instead of a datastore, presenting the configuration information marshaled by a catalog server object in table form to the caller, such as the administration tool 224. In an alternative embodiment, the logical merging functionality of the logic table object 234 and the communications with multiple catalog server objects provided by client table objects 232 and 236 may be combined into a single client table object that binds to multiple catalog server objects. The local catalog server object 226 manages configuration information locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 client table objects 232 and 236 to be created for accessing available catalog server objects 226 and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236 and the administration tool 224. Alternatively, the administration tool 224 may cause only a single client table object (with or without overlaying logic table objects) to be created to access a single catalog server object on a local or remote computer.

Figure 3:
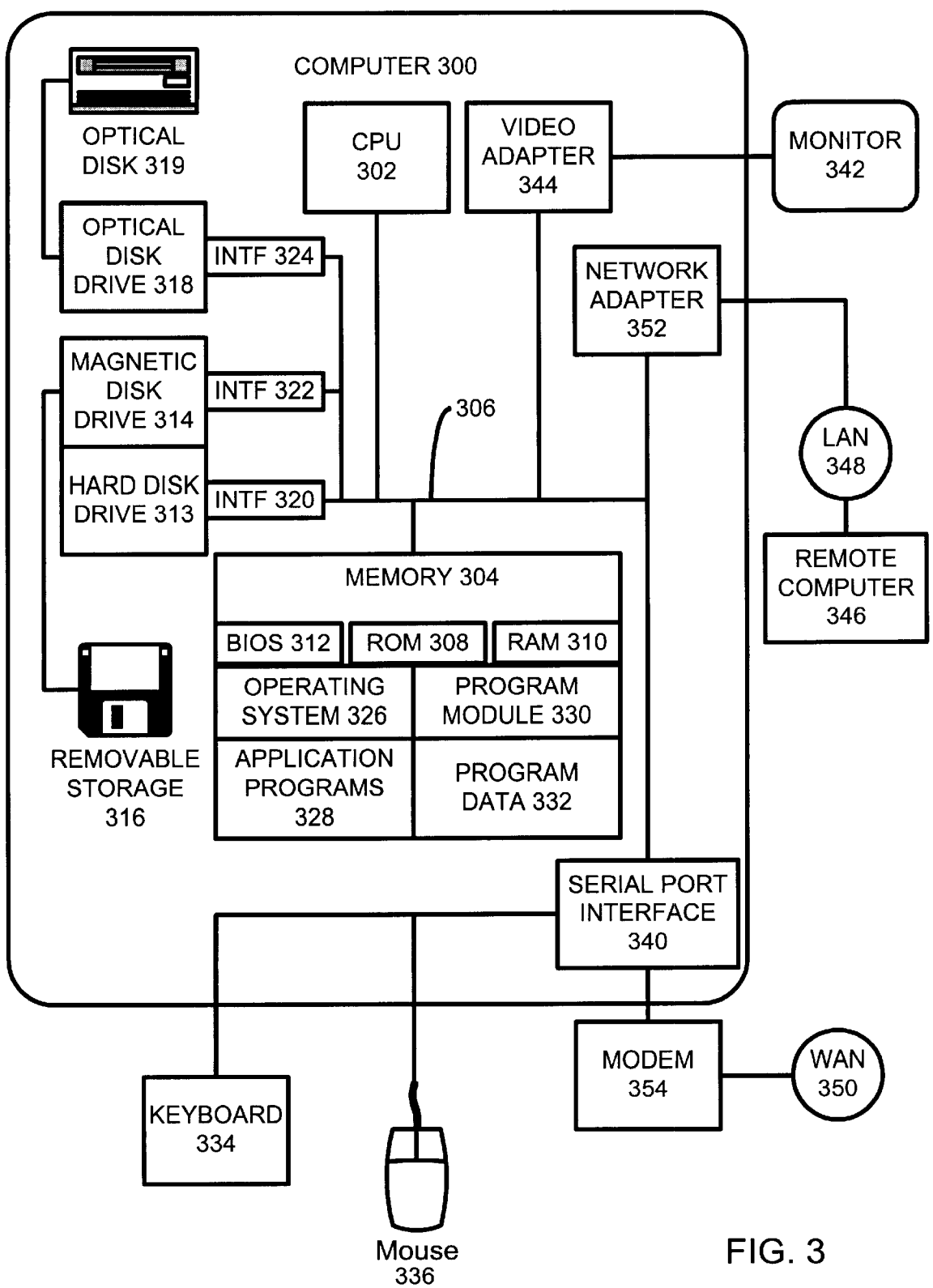
FIG. 3 illustrates a general purpose computer for implementing an embodiment of the present invention.

With reference to FIG. 3, an exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 313 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 313, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communication link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and a table object dispenser, create one or more table objects providing location and type independent access to configuration information stored in one or more datastores.

In an embodiment of the present invention, table objects for accessing one or more datastores in a computer system are obtained via one or more table dispensers or table object dispensers. To access one or more datastores, a caller obtains a table object by passing input parameters to a table dispenser. The table dispenser references a wiring database to determine an appropriate configuration of table objects needed to return the desired table object to the caller. Dispensers are described in more detail in U.S. patent application Ser. No. 09/360,445, entitled "OBTAINING TABLE OBJECTS USING TABLE DISPENSERS", filed concurrently herewith and incorporated herein by reference for all that it discloses and teaches.

The embodiments of the invention described herein may be implemented as logical operations in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

Figure 4:
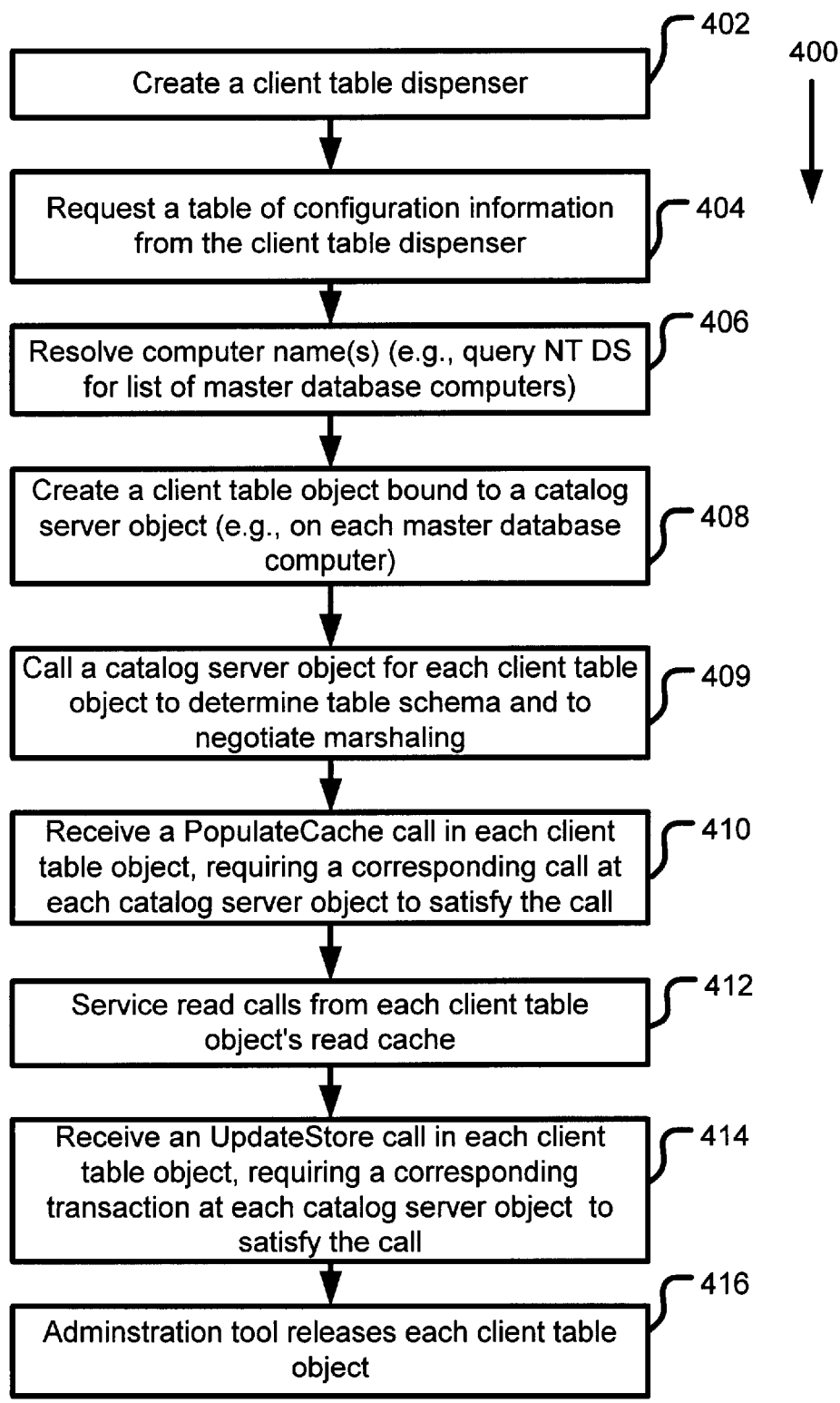
FIG. 4 illustrates a flowchart of operations representing an exemplary operational flow executed or performed at configuration-time in an embodiment of the present invention.

FIG. 4 illustrates a flowchart of operations representing an exemplary operational flow 400 executed or performed at configuration-time in an embodiment of the present invention. The operational flow 400 starts when an administration tool (such as the administration tools 224 or 250 in FIG. 2) requests configuration information from one or more computer systems. The administration tool may be in the form of an application program or console locally or remotely providing a user interface for use by an administrator. Alternatively, the administration tool may be a script processor or administration module automatically executing coded or otherwise defined administrative operations.

The administration tool creates a client table dispenser on the client computer in operation 402. The administration tool requests a table of configuration information from the table dispenser in operation 404, which returns a pointer to a table object (i.e., a logic table object or a client table object) that provides access to the requested table of configuration information. In the descriptions of FIGS. 4, 6, 7, and 8, it is typically assumed that the administration tool is accessing configuration data through a client table object without an intervening logic table object. However, it should be understood that one or more levels of logic table objects may be instantiated between the administration tool and the client table object. Furthermore, the functionality of the dispensers, the client table objects, and the logic table objects may be integrated into one or more objects to provide an appropriate level of abstraction for a requested table. In an embodiment of the present invention, this integration may be specified by the implementation code for each dispenser and/or each object, as well as the wiring information provided by the wiring database.

In an embodiment of the present invention, the one or more computer systems are identified by a server group name, which is resolved, for example, by querying the NT Directory Services in operation 406. This query may be performed by a client table dispenser, a table object dispenser, a logic table object, or the client table object itself. Alternatively, one or more database computer names or other identifiers may be provided to the client table dispenser. If other identifiers are passed, the client table dispenser or other logic (such as a logic table or logic table dispenser) queries a mapping table to resolve the appropriate computer name. Each resolved computer name is passed to a client table object dispenser to create a client table object bound to a catalog server object on each machine.

In an embodiment of the present invention, the request of operation 404 includes table dispenser input parameters specifying a database ID, a table ID, a query, and a level of service (e.g., read-only). For example, the administration tool can specify a database ID corresponding to three server groups and request only library applications according to a table ID. The table dispenser causes one or more client table objects (and if necessary, logic table objects) to be created in order to provide access to the requested table in operation 408. Each client table object receives a computer name that is used to create a catalog server object on the computer corresponding to the computer name (i.e., binding the client table object to the catalog server object on the corresponding computer.)

Each client table object calls its corresponding catalog server object on a computer to determine a table schema and negotiate a marshaling format in operation 409. Generally, marshaling involves the packaging of a call's parameters into a standard format for transmission to another process or computer, which typically unpackages the parameters from the standard format into a format appropriate for the receiving process or computer. Marshaling is described in more detail in *Understanding ActiveX and OLE*, David Chappell, Microsoft Press (1996).

In operation 410, the client table object receives a PopulateCache call from the administration tool, which initiates a corresponding request with the corresponding catalog server object to satisfy the call. Responsive to these transactions, each catalog server object causes the necessary table objects to be dispensed in a table system to satisfy the requirements of its transaction and provides the requested configuration information from its computer in marshaled byte-stream format to its client table object, which records the byte-stream data in its own read cache. In operation 412, the client table object services the call by providing the configuration information to the caller from its cache. The administration tool preferably performs its read operations on the configuration information presented by the client table object through the client table object's read interface. The client table object, however, preferably translates the byte-stream data in the cache into table-oriented data presented to the caller in a client level table.

The administration tool may also write configuration information to a catalog, including a catalog server object located on remote computer system. As shown in operation 414, the client table object receives an UpdateStore call, which requires a corresponding transaction with its corresponding catalog server object to satisfy the call. Having completed its configuration operations, the administration tool releases the client table object in operation 416.

It should be understood that the table information from multiple client table objects may be logically merged for both read and write purposes into a single table interface using a logic table object. In an embodiment of the present invention, the logic table object causes the appropriate client tables objects to be created and bound to a catalog server objects on individual computers. A client table system (i.e., a combination of client table objects and logic table objects) may be transparently obtained by a caller using a client table dispenser.

Figure 5:
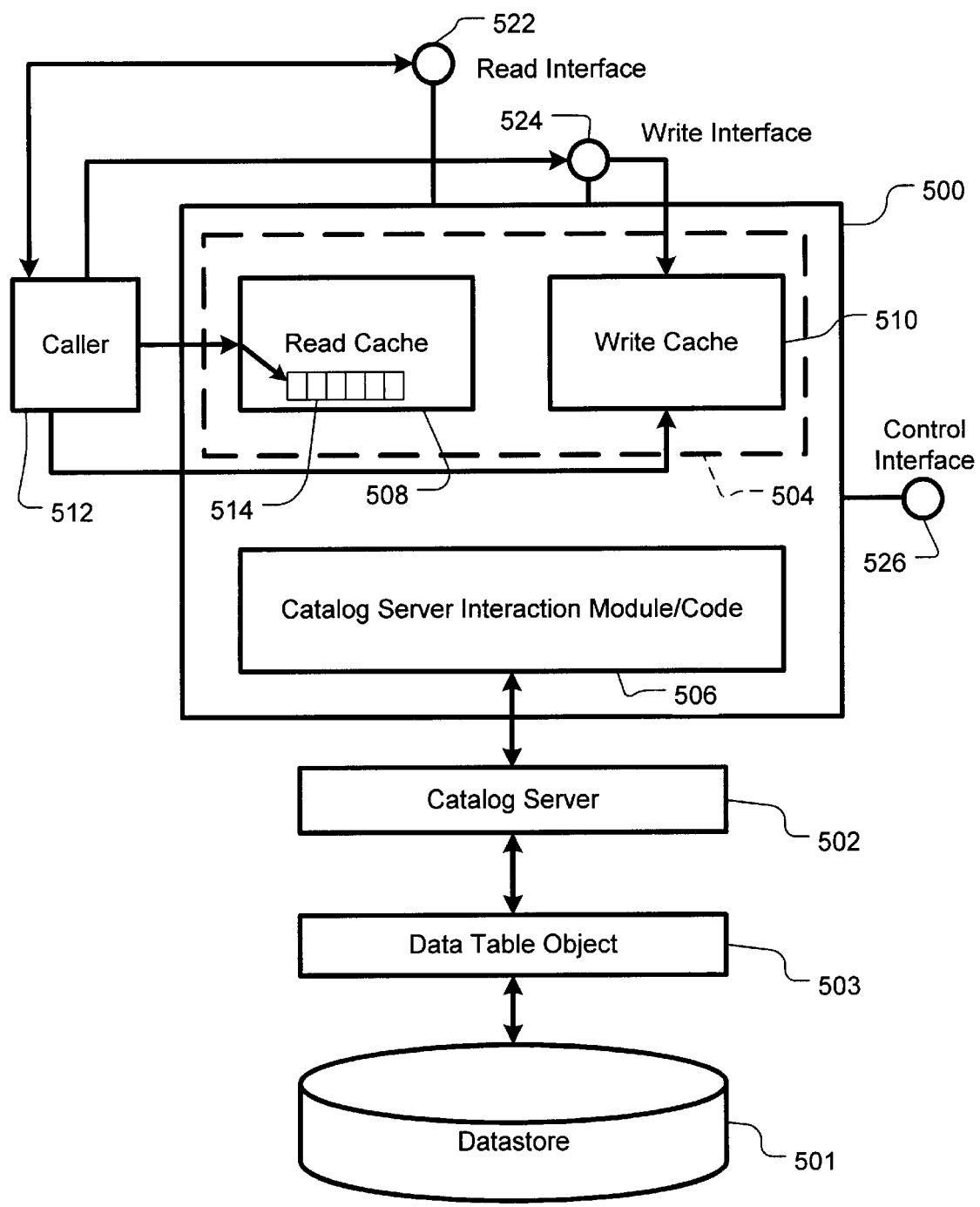
FIG. 5 illustrates an embodiment of a client table object operating with a catalog server object.

An exemplary client table object 500 is shown in FIG. 5. The client table object 500 interacts with catalog server object 502 to both read and write information from and to the datastore 501. The client table object 500 has a memory 504 and a catalog server interaction module or code 506. The memory 504 is preferably cache memory that is used to store information read from the datastore 501 so that caller 512 can read the information. Additionally, the memory 504 is used to store pending changes to the configuration information.

As discussed in more detail below, the catalog server 502 object preferably operates to read and write information from and to the datastore 501 using a data table object 503 which is bound to the specific datastore 501 and provides the communication code between the datastore and the catalog server object. Additionally, the data table object 503 may have cache memory (not shown) which stores information from the datastore and which is accessed by the catalog server object. In an alternative embodiment, the catalog server object could interact with a logic table object (FIG. 2) which would then interact with a data table object 503 (FIG. 5). In yet another embodiment, the catalog server object could interact directly with the datastore 501.

Information is copied into the cache 504 creating a table of configuration information accessible by the caller and presented by the client table object 500. The configuration information may be stored in a byte-stream format in the cache 504 which is presented to the caller as a table of configuration information. The byte-stream format may be the format used by the catalog server in marshaling the information from a remote server computer system (FIG. 2) to the client table object 500. Since the client table object 500 negotiated the session between the catalog server object and the client table object 500, the requisite information is stored in the client table object 500 to allow the client table object 500 to present a legible client level table to the caller. In an alternative embodiment, the client table object 500 unmarshals the information received from the catalog server object before storing the information in the cache memory 504. In yet another embodiment, the information is received by the client table object 500 in an unmarshaled format and is stored in substantially the same format for the caller. An exemplary situation where the client table object 500 receives unmarshaled information occurs when the catalog server object is present on the local client computer system (such as computer 200 shown in FIG. 2).

The catalog server interaction module or code 506 receives commands from the caller 512 and executes related interface commands during interaction with the catalog server object 502. The caller 512 requests that the client table object 500 execute specific commands related to specific catalog server objects. In other words, when the caller 512 sends a command to the client table object requesting a communication such as a read or a write from or to a catalog server object, the caller preferably provides the client table object 500 with information related to which catalog server object is to be contacted. The catalog server interaction code 506 translates the particular commands from the caller into proper format and conducts the request to the particular catalog server object 502. The code 506 causes a transaction or communication with a catalog server object only when populating the cache with information from a datastore, updating the datastore, or requiring some other control-type transaction. All work on the configuration information is conducted on the local cache 504 and thus, fewer round-trip calls are required than in the case where information is not stored in a cache 504.

The catalog server interaction code 506 interacts with the catalog server object 502 to both populate the cache 504 and update the information in the datastores. That is, the code 506 receives commands from the caller requesting that the cache be populated with a portion of data managed by the catalog server object 502 and based on a supplied query. Code 506 generates and conducts an interaction command to the catalog server object implementing the populate request to populate the cache 504 with the requested information. That is, the catalog server interaction code 506 translates the query into the proper format and requests the information based on the query. The query may be related to the type of information, as opposed to requests that simply identify specific data.

Similarly, the "update" datastore commands received by the client table object 500 are translated by the code 506 into the specific format as necessary to cause the catalog server object 502 to update or modify at least one datastore. Additionally, the code 506 may interact with the catalog server object based on control-type commands from the caller 512. Such control-type commands may include initialization of the catalog server object 502 or merely the transfer of data to the catalog server unrelated to configuration information.

Allocation of the cache 504 occurs during the creation of the client table object 500. The cache 504 has a read cache 508 and a write cache 510. The read cache 508 is not modifiable and is populated with a specific configuration information table, in the form of a byte-stream, as a result of a query by a caller 512. Code 506 executes the query request and stores the returned information in the read cache 508. The client table object 500 uses the write cache 510 to store proposed modifications or additions to the datastore configuration information. Such information is stored until the caller requests that the code 506 update the datastore. At that time the code 506 uses the write cache information (not shown) to execute the update command. The information is stored in the write cache as a byte-stream in the same format as the read cache information. Therefore, no marshaling is necessary when an update store command is executed. Alternatively, the information could be stored in an unmarshaled format. Consequently, modified configuration information stored in the write cache 510 as part of the update command which transfers information to the particular catalog server object that communicates with the datastore to be modified.

In alternative embodiments, the cache 504 comprises only a read cache or a write cache. Such other embodiments are typically beneficial in particular circumstances when only reading or writing is desired since those embodiments provide better performance for quick reads or writes by providing a smaller working set for the caller. Preferably, the caller can choose a level of service that provides either the combined read and write cache 504 or just a read cache 508 or just a write cache 510. Therefore, as little cache as necessary is allotted the client table object 500 during creation which reduces the working set for this particular process and may relatively increase the performance associated with the process.

In yet another embodiment, the cache 504 is implemented as part of another object (such as the logic table 234 shown in FIG. 2). In such a case, the client table object 500 does not have a cache and is used primarily to provide access to the catalog server objects. Although the cache 504 and the code 506 are elements of the client table object 500, the cache and code are relatively distinct from each other. The code 506 simply performs operations using the cache 504.

The client table object 500 may be an instantiated object in the object-oriented catalog management system shown in FIG. 2. As an object, the client table object 500 exposes interfaces that enable the caller to interact with the client table object 500 by supplying the caller with pointers to the interfaces. It is through these interfaces that the methods are implemented for each client table object. The client level table 514 is accessed through these methods enabling the caller to read and write rows and columns of table 514.

The client table object 500 may be a COM object and the exposed set of interfaces are used by either the caller to read or write the table of configuration information presented to the caller in the cache 504 or by other processes to control the client table object 500. Interface 522 exposes read methods and allows the caller to access and manipulate a cursor within the read cache 508. Interface 524 exposes the write methods. Additionally, the interface 524 preferably inherits from the read interface 522 so that the caller can perform read and write methods using interface 524. Additionally, the client table object 500 may have a control interface 526 which exposes control-type methods not necessarily required to implement the client table object 500 but provide added functionality to the client table object 500.

The primary methods exposed by the client table object 500 generally include at least one populate method, at least one update method, and read/write/navigate methods. Additional methods are also preferably exposed to enhance the functionality of the client table object 500. The populate method relates to populating the read cache with data from the datastore 501 based on a supplied query. The update method updates the datastore using information stored in the write cache 510. The read/navigate methods allow for row navigation and enable the caller to view different rows in the configuration table or to view columns of information. Additionally, the client table object 500 provides write methods to place data in the write cache and control-type methods that are exploitable by the caller 512.

Importantly, the populate cache method does not purge the entire contents of the cache memory. Therefore, several populate cache methods may be used to create a client level table 514 having information from more than one computer systems managed by different catalog servers. Similarly, update methods may be used to either update the datastore while purging the write cache (and/or the read cache) or to simply update the datastore while maintaining the read cache and the write cache unchanged. This provides the user significant control regarding purging of the cache 504.

Figure 6:
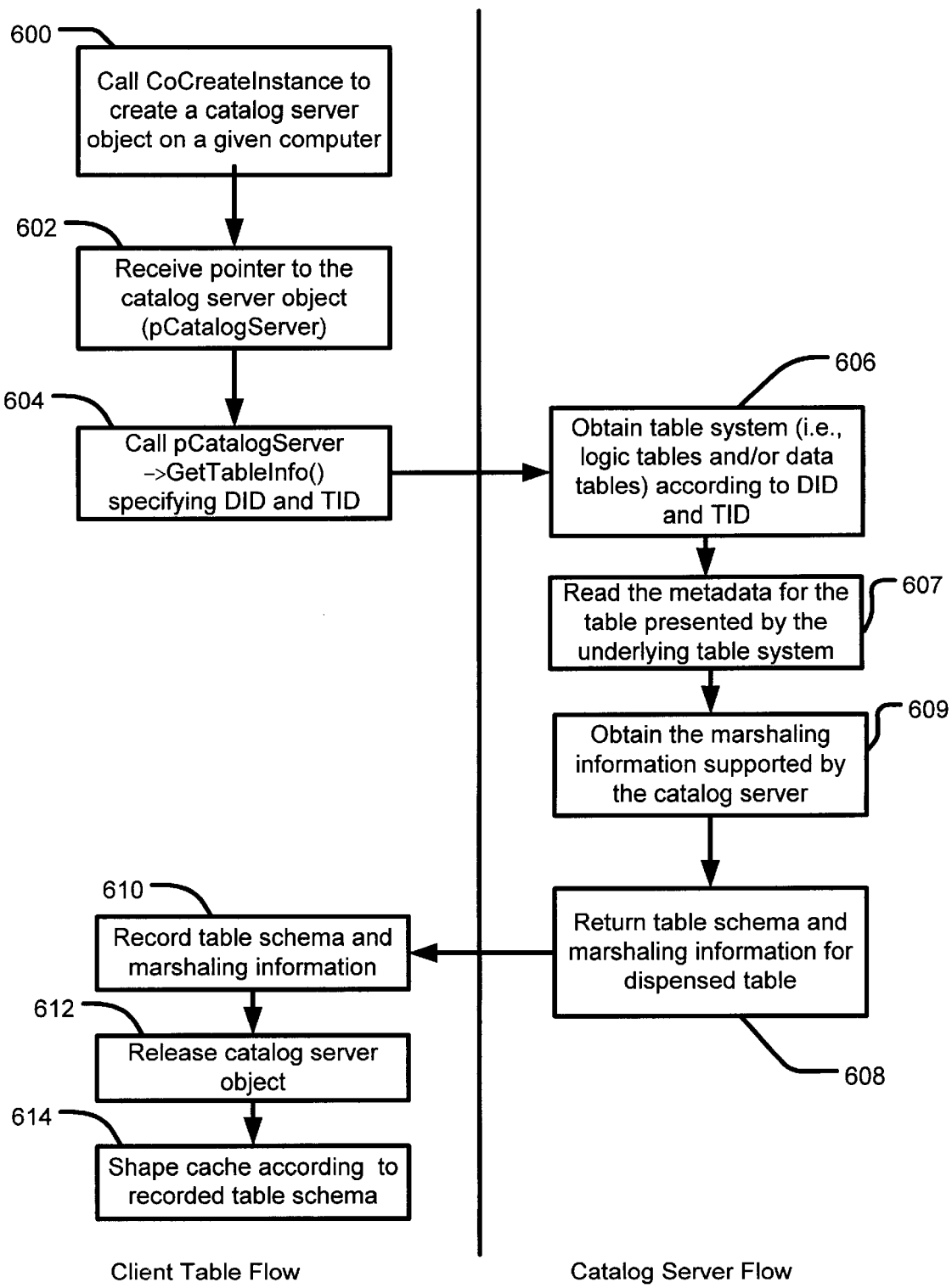
FIG. 6 illustrates a call sequence flowchart for an exemplary initialization operational flow associated with a client table object in an embodiment of the present invention.

FIG. 6 illustrates a call sequence flowchart for an exemplary initialization (GetTableInfo) operational flow associated with a client table object to initialize access to configuration information on a local or remote computer in an embodiment of the present invention. In the client table flow, operation 600 calls a CoCreateInstance function to create a catalog server object on a given computer (preferably identified by a computer name passed by the caller). A pointer to the catalog server object (pCatalogServer) is returned to the client table object in operation 602. In operation 604, the client table object calls pCatalogServer->GetTableInfo( ), specifying a DID, a TID, and other parameters (which were passed into the client table object when it was created) to inform the catalog server object of the identity of the configuration information table it is requesting and of the communication characteristics the client table object supports.

For example, version parameters (i.e., the lowest and highest versions of communications sessions supported by the client table object), passed by the GetTableInfo call of operation 604, assist in the negotiation of the communication session. The catalog server object selects the highest session version supported by both the catalog server object and the client table object. If no commonly supported session version exists, the client table object is thus notified of the incompatibility.

In operation 606, the catalog server object (regardless of whether the catalog server object is located in a local or remote computer) causes a table dispenser to dispense the underlying table system (i.e., combination of logic table objects and/or data table objects) on the catalog server object's computer, which provides the requested table of configuration information on that computer. In operation 607, the catalog server object queries its table system to get metadata for the requested table and for columns of the requested table, which provides the table schema of the requested table.

Operation 609 determines the marshaling scheme supported by the catalog server object and the calling client table object. The marshaling scheme specifies the marshaling format agreed upon by the catalog server object and the client table object to allow the cross-process and/or cross-computer communication of the data. A standard marshaling scheme supported by the operating system or application framework may be negotiated. Alternatively, another marshaling format may be used. For example, the client table object and the catalog server object may agree to marshal the configuration data using XML (extensible markup language) stream format.

Operation 608 returns the table schema (e.g., derived from table metadata and column metadata) and marshaling information to the client table object. The client table object records the table schema and marshaling information (i.e., table information) in operation 610. Operation 612 releases the catalog server object. With each request that requires access to the underlying datastore (such as GetTableInfo, PopulateCache, UpdateStore), the catalog server object is recreated and then released. Likewise, the table system employed by the catalog server object to service each transaction is dispensed and released with each transaction.

Operation 614 shapes the cache (e.g., one or more memory buffers) in the client table object in accordance with the table schema and marshaling information (i.e., table information) returned from the catalog server object. In other words, the table schema and marshaling information inform the client table object of the format of the marshaled data to be retrieved from the catalog server object in the future. In an embodiment of the present invention, "shaping" refers to recording the table information to support translation of the marshaled configuration information to and from the cache of the client table object, responsive to a read or write request. In an alternative embodiment, "shaping" refers to the allocation and definition of the cache stored unmarshaled configuration data in the client table object in accordance with the table information.

If tables from multiple catalog server objects are logically merged into a single client table object, then one or more caches may be shaped according to each table schema and for each catalog server. Otherwise, another layer of logic (provided by a logic table object) can logically merge configuration information from multiple catalog server objects (and multiple client table objects).

Figure 7:
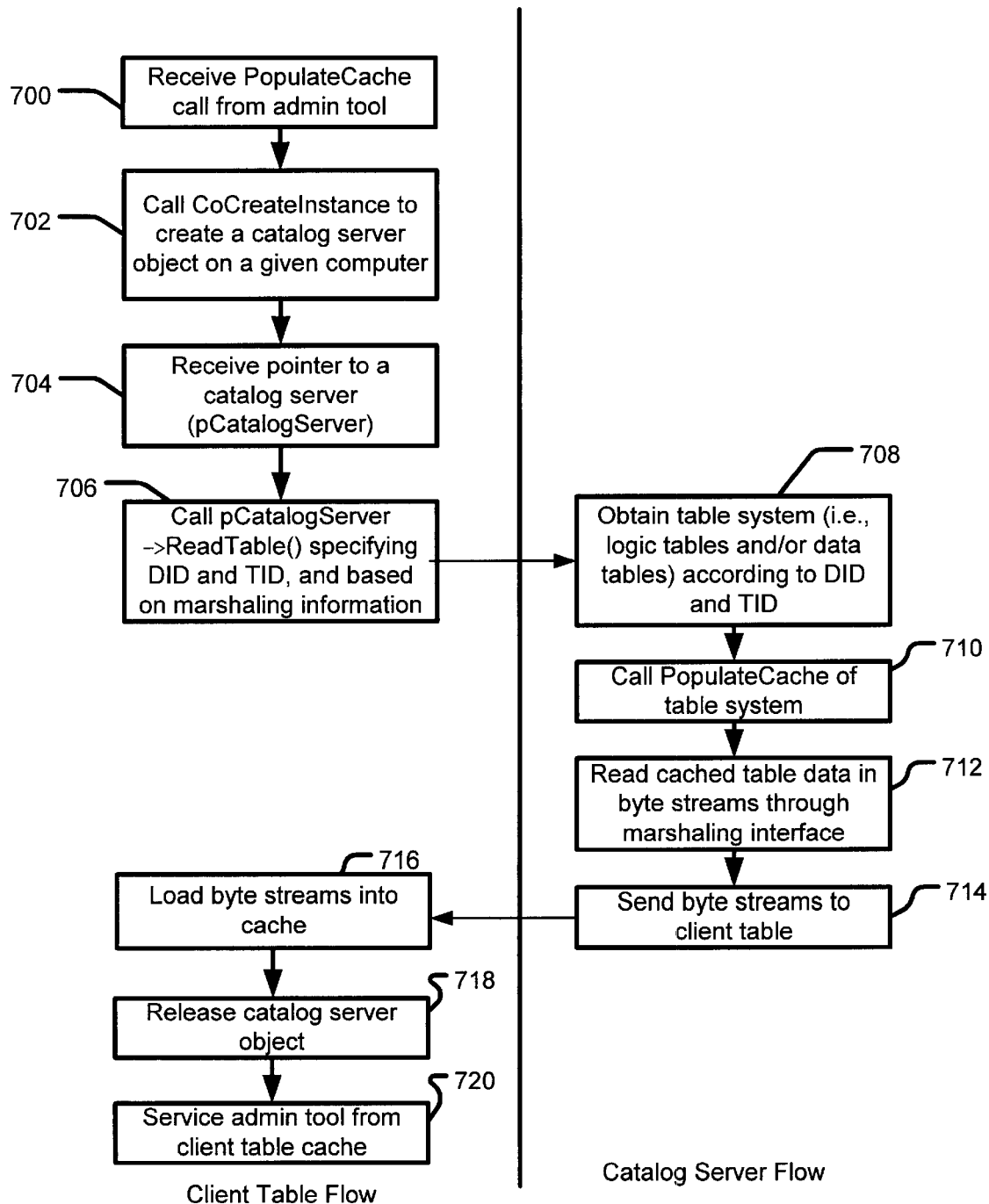
FIG. 7 illustrates a call sequence flowchart of an exemplary PopulateCache operational flow associated with a client table object in an embodiment of the present invention.

FIG. 7 illustrates a read call sequence flowchart for an exemplary PopulateCache operational flow from a client table object to fill a cache of a client table object with configuration data from a catalog server object in an embodiment of the present invention. In the client table flow, operation 700 receives a PopulateCache call from the administration ("admin") tool. Operation 702 calls a CoCreateInstance function to create a catalog server object on a named computer. The name of the computer on which the catalog server is located was recorded by client table object in the initialization operation described above in conjunction with FIG. 6 and is now passed via the CoCreateInstance call. A pointer to the catalog server object ("pCatalogServer") is returned to the client table object in operation 704. In operation 706, the client table object calls pCatalogServer->ReadTable( ), specifying a DID and a TID, to inform the catalog server of the identity of the configuration information table that the client table object is requesting. The particular catalog server method that corresponds to the PopulateCache method (i.e., a "ReadTable" method in the catalog server object) in the client table object is specified in the marshaling information obtained and recorded by the client table object in the initialization operation described above in conjunction with FIG. 6.

In operation 708, the catalog server object causes a table dispenser to dispense the underlying table system (i.e., combination of logic table objects and/or data table objects) required to provide the requested table of configuration information. In operation 710, the catalog server object calls the corresponding PopulateCache method in its table system to satisfy the ReadTable call received from the client table object in operation 706. The PopulateCache call causes each data table object in the catalog server object's table system to retrieve configuration information from the datastore to which it is bound. The configuration information retrieved from each underlying datastore is stored in the read cache of each corresponding data table object in the catalog table's table system. Once the read cache or caches of the underlying data tables are populated, the catalog server object has read access to this configuration information through the data table object and logic table object interfaces, as described more completely specified in previously incorporated U.S. patent application Ser. No. 09/360,442, entitled "DATA TABLE OBJECT INTERFACE FOR DATASTORE" and 09/360,440, entitled "A LOGIC TABLE ABSTRACTION LAYER FOR ACCESSING CONFIGURATION INFORMATION".

Operation 712 determines the proper marshaling scheme to be used by the catalog server object in transferring the table data to the client table object. More specifically, the catalog server object requests an interface identifier of an interface that is capable of marshaling the configuration information so that the client table object can access the configuration information. The catalog server object obtains a pointer to the marshaling interface and requests that the marshaling interface provide (i.e., supply) the requested table in a marshalable byte-stream format. As a result, the table data of configuration information is read from the data table object's cache (potentially through one or more logic table objects) through the identified marshaling interface to configure one or more byte-streams in the appropriate marshaling format.

Operation 714 communicates the byte-streams to the client table object, which preferably loads the marshaled configuration information into its own read cache in operation 716. The byte-streams also include metadata about how to interpret the byte-stream, including the size of the byte-stream and offsets into the byte-stream of particular data sets. Operation 718 releases the catalog server object.

After the client table object's cache is populated, read requests to the client table object are serviced out of the client table cache in operation 720, at least until another PopulateCache call is made to a catalog server object. The read methods translate (i.e., unmarshal) the marshaled configuration information byte-streams from the read cache to accommodate the table interface presented to the administration tool, thereby unmarshaling configuration information read by the caller, rather than all configuration information received from the catalog server object. Preferably, the translation is performed by a cache object that provides the read or write cache. The client table object uses the table information retrieved in the initialization operations of FIG. 6 to perform this translation.

In an alternative embodiment, the configuration information is unmarshaled before being stored to the cache, thereby alleviating the need for the client table object to translate when servicing read calls. Likewise, the new configuration information written to a write cache of the client table object is marshaled before being transmitted to the catalog server.

Figure 8:
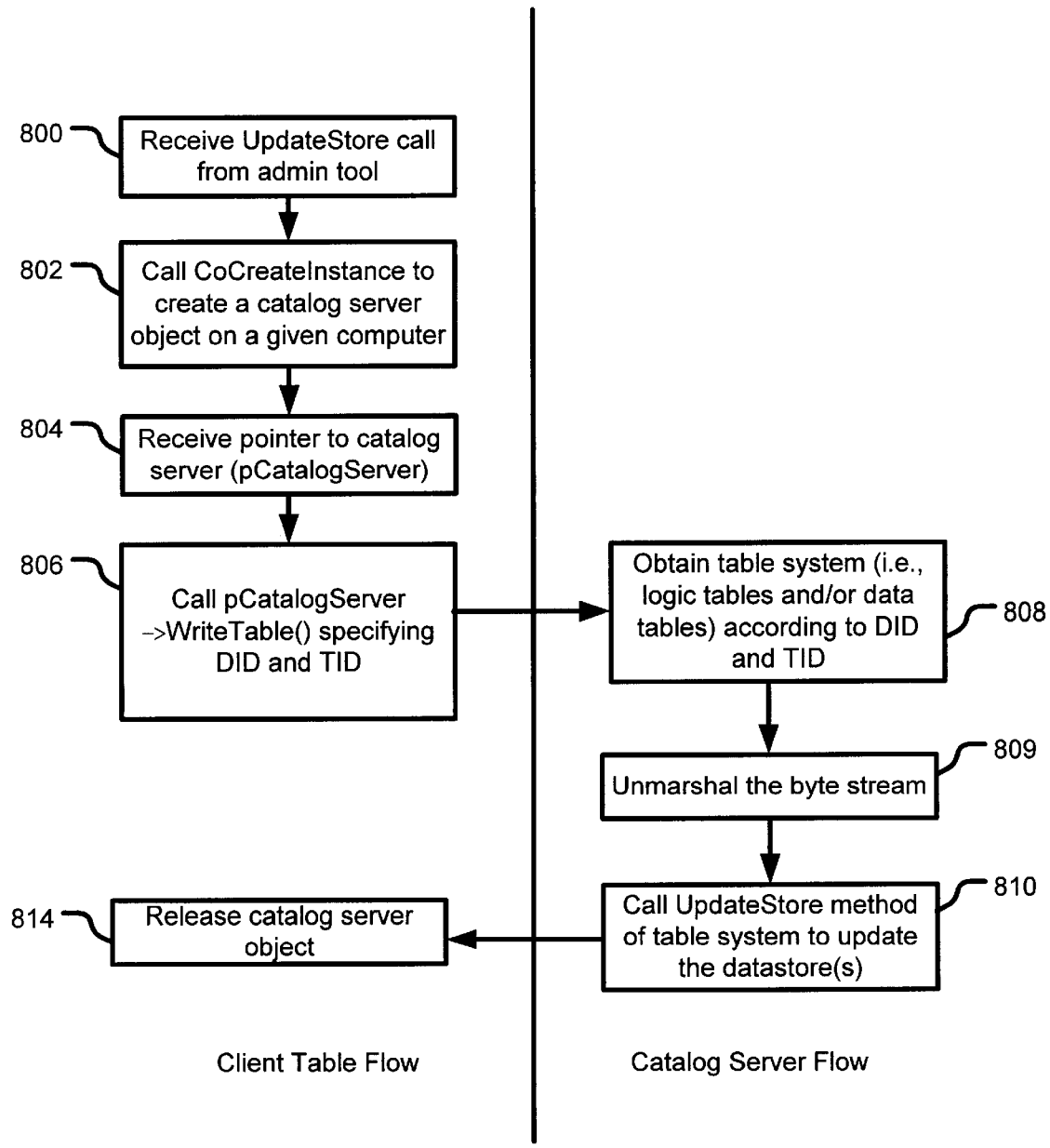
FIG. 8 illustrates a call sequence flowchart of an exemplary UpdateStore transaction associated with a client table object in an embodiment of the present invention.

FIG. 8 illustrates a write call sequence flowchart for an exemplary UpdateStore transaction from a client table object to record changes to configuration information provided by a catalog server object in an embodiment of the present invention. Administration tool update to the configuration information may be written to a write cache in the client table object. Such information is preferably translated (i.e., marshaled) into byte-streams as it is written to the write cache, in accordance with the table information determined during the initialization operation of FIG. 6. Alternatively, the updates can be written directly to the write cache and marshaled together in a group before being communicated to the catalog server object.

As with the data in the read byte-stream, byte-stream format data accompanies the updates, such as data specifying the nature of changes on a per-row basis (e.g., insert, update, delete, or ignored) and/or on a per-column basis (i.e., which columns have changed).

On the client table side, operation 800 receives an UpdateStore call from the administration ("admin") tool. Operation 802 calls CoCreateInstance to create a catalog server on a named computer. The name of the computer on which the catalog server is located was recorded by client table object in the initialization operation described above in conjunction with FIG. 6 and is now passed via the CoCreateInstance call. A pointer to the catalog server object (pCatalogServer) is returned to the client table object in operation 804. In operation 806, the client table object calls pCatalogServer>WriteTable( ), specifying a DID and a TID, to inform the catalog server object of the identity of the configuration information table to be modified. The particular catalog server method that corresponds to the UpdateStore method in the client table object is specified in the marshaling information obtained by the client table object in the initiation operations as described in conjunction with FIG. 6.

In operation 808, the catalog server object causes a table dispenser to dispense the underlying table system (i.e., combination of logic table objects and/or data table objects) required to provide the requested table of configuration information. Operation 809 unmarshals the marshaled configuration information byte-stream. More specifically, the catalog server requests an interface identifier of an interface that is capable of unmarshaling the configuration information transmitted by the client table object. The catalog server object then obtains a pointer to the marshaling interface and requests that it consume the marshaled byte-stream to generate a table of new configuration information. In operation 810, the catalog server object calls the corresponding UpdateStore method in its table system to satisfy the WriteTable call it received from the client table object. Operation 814 releases the catalog server object.

It is to be understood that even though numerous characteristics and advantages of various embodiments of the present invention have been set forth in the foregoing description, together with details of the structure and function of various embodiments of the invention. This disclosure is illustrative only, and changes may be made in detail within the principles of the present invention to the full extent indicated by the broad general meaning of the terms in which the appended claims are expressed.

What is claimed is:

1. A computer program storage medium readable by a computing system and encoding a computer program for executing a computer process accessing a requested table of configuration information through a catalog server object that manages the configuration information in one or more datastores, the computer process comprising:

creating a table object having a cache that stores the configuration information;

querying the catalog server object for table information describing the requested table;

receiving the table information from the catalog server object;

recording the table information in the table object; and accessing the configuration information through the cache of the table object in accordance with the table information.

2. The computer program storage medium of claim 1 wherein the operation of receiving the table information comprises:

receiving a table schema for the requested table.

3. The computer program storage medium of claim 2 wherein the computer process further comprises:

shaping a cache in the table object in accordance with the table schema received from the catalog server object.

4. The computer program storage medium of claim 1 wherein the operation of receiving the table information comprises:

receiving marshaling information for communication of the requested table between table object and the catalog server object.

5. The computer program storage medium of claim 1 wherein the computer process further comprises:

querying one or more remote catalog server objects for the configuration information via the table object.

6. The computer program storage medium of claim 5 wherein the computer process further comprises:

resolving identifiers of computers on which the remote catalog server objects storing the configuration information execute; and creating each of the remote catalog server objects based on the identifiers.

7. The computer program storage medium of claim 1 wherein the operation of accessing the configuration information comprises:

creating the catalog server object;

requesting the catalog server object to populate the cache of the table object;

creating a table system bound to the catalog server object to access the requested table of configuration information;

reading the configuration information from one or more of the datastores;

marshaling the requested table of the configuration information into a marshaled format in the catalog server object for communication to the table object;

communicating the configuration information in the marshaled format from the catalog server object to the table object; and recording the configuration information in the marshaled format to the cache of the table object.

8. The computer program storage medium of claim 7 wherein the computer process further comprises:

releasing the catalog server object; and servicing a subsequent read call from the cache of the table object without reconnecting to the catalog server object.

9. The computer program storage medium of claim 8 wherein the computer process further comprises:

translating the configuration information in the cache from marshaled format to a format of the requested table of configuration information, based on the table information.

10. The computer program storage medium of claim 1 wherein the operation of accessing the configuration information comprises:

recording new configuration information to the cache of the table object in marshaled format, based on the table information;

creating the catalog server object;

requesting the catalog server object to update the one or more of the datastores with the new configuration information from the cache of the table object;

creating a table system bound to the catalog server object to access each datastore being updated;

communicating the new configuration information in the cache to the catalog server;

unmarshaling the new configuration information received from the table object; and writing the new configuration information received from the table object to each datastore being updated.

11. The computer program storage medium of claim 1 wherein the computer process further comprises:

binding a logic table object to the table object to provide additional logic for accessing the requested table of configuration information.

12. A computer data signal embodied in a carrier wave by a computing system encoding a computer program for executing a computer process for reading a requested table of configuration information through a catalog server object that manages the configuration information in one or more datastores, the computer program comprising:

requesting the catalog server object to populate a cache of a table object;

creating a table system bound to the catalog server object to access the requested table of configuration information;

reading the configuration information from each datastore;

marshaling the requested table of the configuration information into a marshaled format in the catalog server object for communication to the table object;

communicating the configuration information in the marshaled format from the catalog server object to the table object; and recording the configuration information to the cache of the table object.

13. The computer data signal of claim 12 wherein the operation of recording the configuration information comprises:

recording the configuration information in the cache of the table object in the marshaled format; and unmarshaling the configuration information from the cache in response to a read request.

14. The computer data signal of claim 12 wherein the computer program further comprises:

releasing the catalog server object; and servicing a subsequent read request from the cache of the table object without reconnecting to the catalog server object.

15. A computer data signal embodied in a carrier wave by a computing system encoding a computer program for executing a computer process for writing an update to a requested table of configuration information through a catalog server object that manages the configuration information in one or more datastores, the computer program comprising:

recording new configuration information to a cache of a table object;

requesting the catalog server object to update a datastore with the new configuration information from the cache of the table object;

creating a table system bound to the catalog server object to access the datastore;

communicating the new configuration information in the cache to the catalog server object;

unmarshaling the new configuration information received from the table object; and writing the new configuration information received from the table object to the datastore.

16. The computer data signal of claim 15 wherein the operation of recording new configuration information comprises:

recording the new configuration information to the cache of the table object in marshaled format.

17. A system for accessing a requested table of configuration information stored in one or more datastores, the system comprising:

a table object having a cache that stores the configuration information and a table interface through which a caller can access the requested table of configuration information in the cache;

a catalog server object managing the configuration information stored a datastore and communicating the configuration information with the table object; and a table system created by the catalog server object to provide the catalog server object with access to the requested table of configuration information stored in the datastore.

18. The system of claim 17 further comprising table information stored in the table object defining a table schema associated with the table information.

19. The system of claim 17 further comprising table information stored in the table object defining a marshaling scheme used by the catalog serve object in communicating the configuration information.

20. The system of claim 17 further comprising a catalog server interaction module adapted to access the catalog server object and populate the cache with the configuration information.

21. The system of claim 17 further comprising a catalog server interaction module adapted to access the catalog server object and update the datastore with the configuration information.

* * * * *